United States Patent
Sato

(10) Patent No.: US 9,288,346 B2
(45) Date of Patent: Mar. 15, 2016

(54) IMAGE PROCESSING APPARATUS FOR READING AND PROCESSING A DOCUMENT IMAGE AND CONTROL METHOD THEREOF

(71) Applicant: CANON KABUSHIKI KAISHA, Tokyo (JP)

(72) Inventor: Masayuki Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 69 days.

(21) Appl. No.: 13/669,605

(22) Filed: Nov. 6, 2012

(65) Prior Publication Data
US 2013/0135644 A1 May 30, 2013

(30) Foreign Application Priority Data
Nov. 28, 2011 (JP) .................. 2011-259514

(51) Int. Cl.
G06K 15/02 (2006.01)
H04N 1/00 (2006.01)

(52) U.S. Cl.
CPC ....... H04N 1/00411 (2013.01); H04N 1/00474 (2013.01); H04N 1/00482 (2013.01); H04N 1/00506 (2013.01); *H04N 2201/0094* (2013.01); *H04N 2201/3222* (2013.01); *H04N 2201/3273* (2013.01); *H04N 2201/3276* (2013.01)

(58) Field of Classification Search
CPC .......... H04N 1/00411; H04N 1/00482; H04N 1/00506; H04N 1/00474; H04N 2201/3276; H04N 2201/3273; H04N 2201/3222; H04N 2201/0094; G06K 15/02

USPC ......... 358/1.1, 1.9, 1.12, 1.13, 1.15, 474, 488
See application file for complete search history.

(56) References Cited

U.S. PATENT DOCUMENTS

| 7,511,843 | B2 * | 3/2009 | Ikeno ........................ 358/1.15 |
| 2008/0043283 | A1 * | 2/2008 | Takeda ....................... 358/1.15 |
| 2009/0021769 | A1 * | 1/2009 | Edmonds ................... 358/1.15 |

FOREIGN PATENT DOCUMENTS

| CN | 1625207 A | 6/2005 |
| JP | 2000-147956 A | 5/2000 |
| JP | 2008-018541 A | 1/2008 |
| JP | 2011-175330 A | 9/2011 |

OTHER PUBLICATIONS

Chinese Office Action issued in corresponding application No. 201210491180.9 on Jun. 8, 2015.
Japanese Office Action issued in corresponding application No. 2011-259514 on Sep. 7, 2015.

* cited by examiner

*Primary Examiner* — Thomas D Lee
(74) *Attorney, Agent, or Firm* — Carter, DeLuca, Farrell & Schmidt, LLP

(57) ABSTRACT

An image processing apparatus according to one aspect of this invention receives an instruction for using a first function, receives, from the user, a document orientation to be used for the first function, stores the received document orientation in a storage unit. The image processing apparatus further causes the storage unit to hold the document orientation stored in the storage unit even when the instruction for using the first function is canceled, and uses the document orientation for a second function different from the first function.

7 Claims, 13 Drawing Sheets

F I G. 4
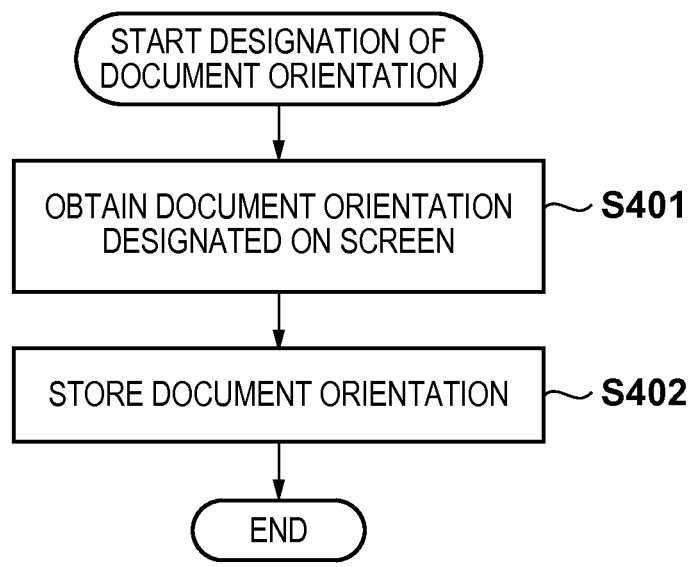

F I G. 15
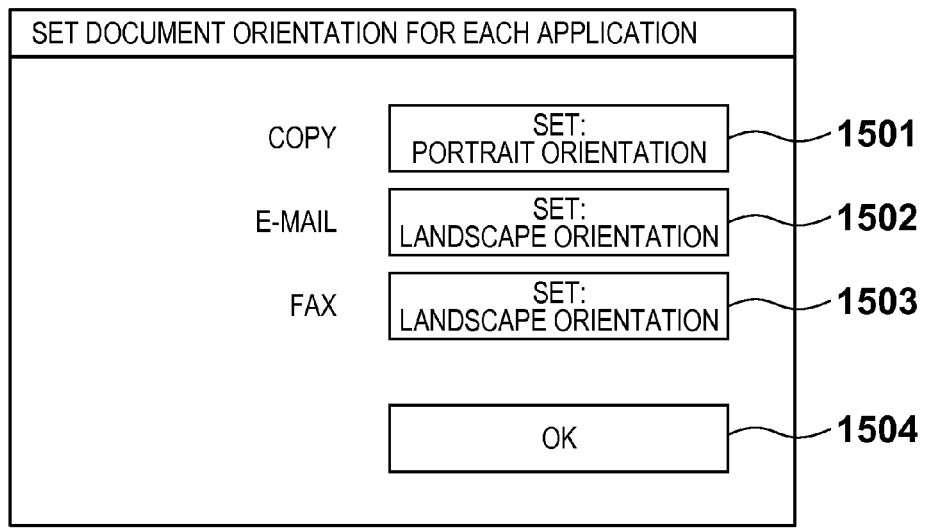
F I G. 16
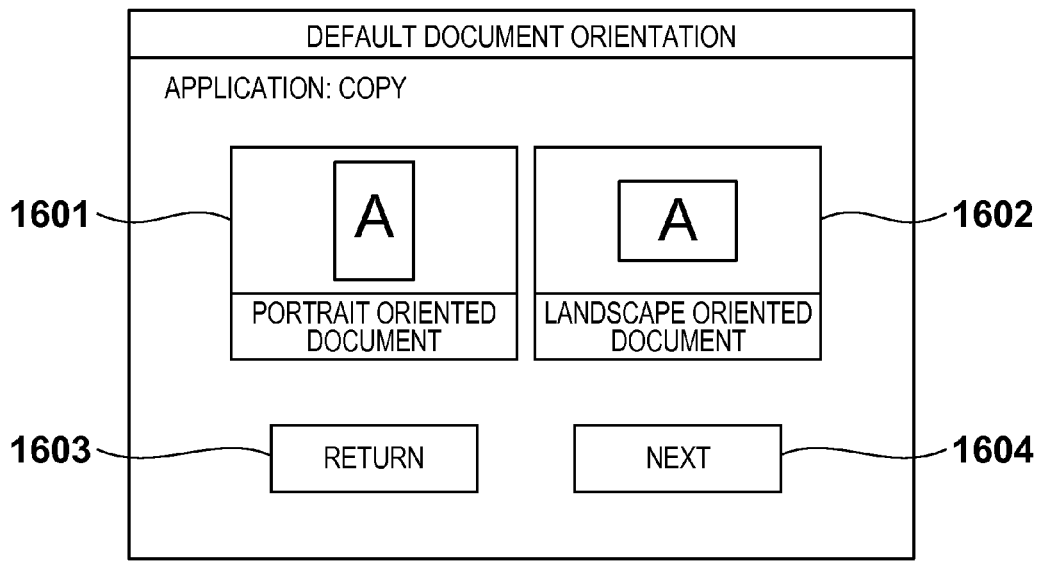

F I G. 17
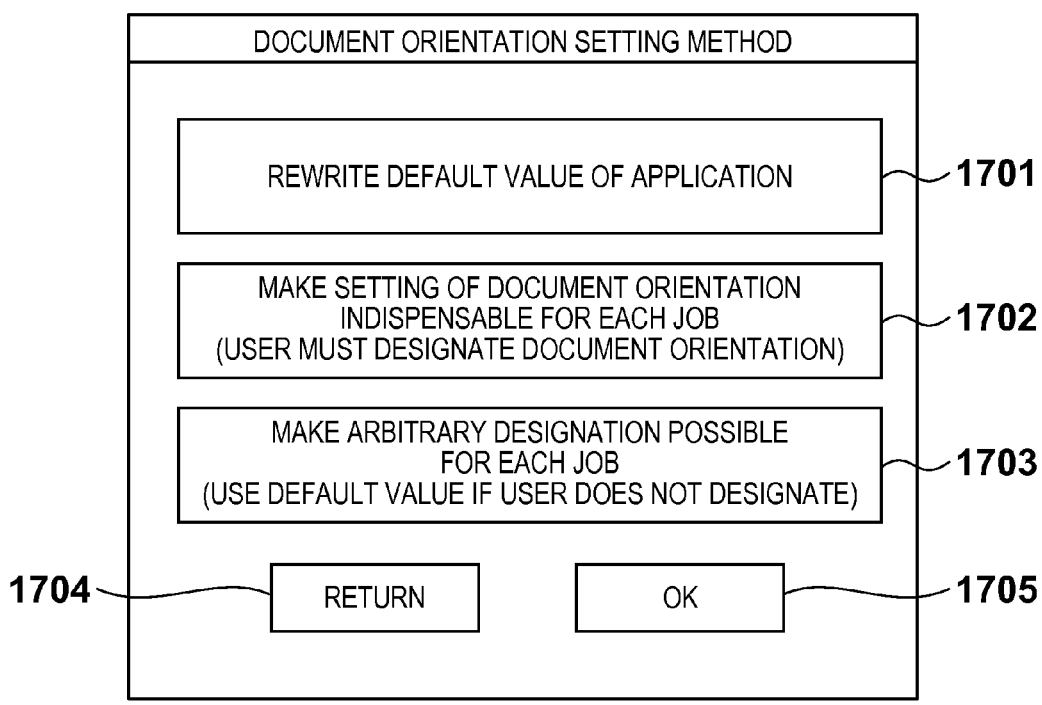

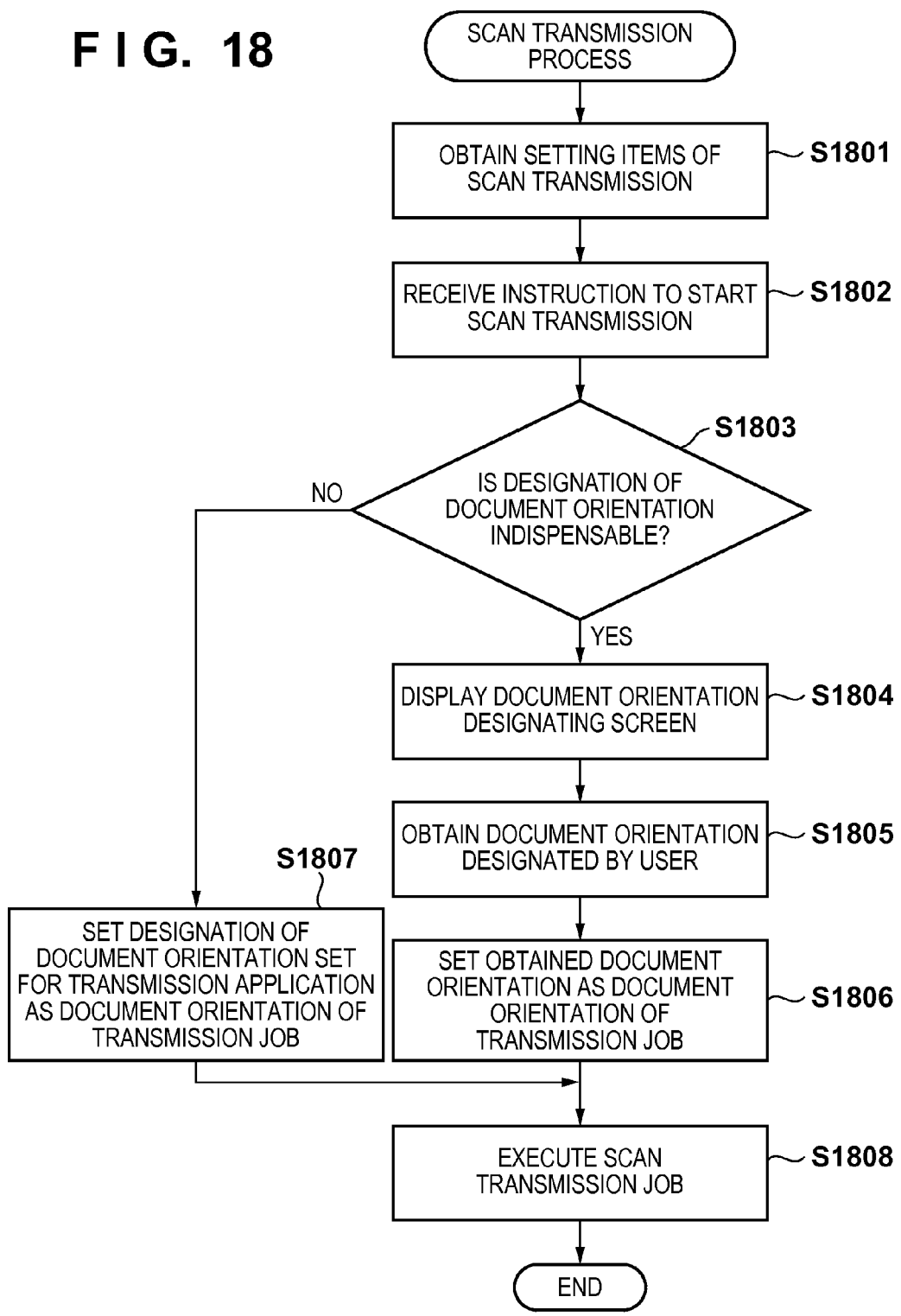

ively used in copying, but many users use land-
scape oriented documents as forms in facsimile. To correctly

IMAGE PROCESSING APPARATUS FOR READING AND PROCESSING A DOCUMENT IMAGE AND CONTROL METHOD THEREOF

BACKGROUND OF THE INVENTION

1. Field of the Invention

The present invention relates to an image processing apparatus for reading and processing a document image, and a control method thereof.

2. Description of the Related Art

Recently, small-sized, multi-function peripherals (MFPs) having a copying function, facsimile function, e-mail transmitting/receiving function, and the like are increasing in number. Consequently, MFPs that read an image of the short edge of an A4/LTR document due to the limitations on the conveying mechanism size of an apparatus without using any document sheet width sensor in a document reader are increasing in number. A feature of MFPs like this is that they cannot automatically detect the orientation of a document before executing a job, because the short edge of an A4/LTR document is always read regardless of whether the document is a portrait or landscape oriented document.

As a solution to this problem, a default document orientation is unconditionally determined (normally, a portrait oriented document). Also, Japanese Patent Laid-Open No. 2000-147956 has disclosed a method in which the user must input the orientation of a document on a setting screen for a function (for example, double-sided copying or N-in-1 printing function (2-in-1 or the like)) for which the user must reliably set the orientation of a document.

Unfortunately, this method has several problems. The first problem is that the orientation of a document once set by the user on a setting screen for a given function is canceled if the setting of the function is canceled. For example, even when the orientation of a document is once set by a function such as N-in-1 printing or double-sided copying, if this function is canceled, information on the document orientation set by the function is also canceled. Therefore, when designating another function for which the orientation of a document must be set, the user must set the orientation of a document again, and this makes the operation cumbersome.

The second problem is that a method of confirming the set document orientation is complicated. Conventionally, the orientation of a document is designated through a plurality of operation screens for a function such as N-in-1 printing or double-sided copying. Accordingly, there is no method of simply confirming the document orientation set for the designated function by the user.

The third problem is that there is no method of causing the user to reliably set the orientation of a document when using a function for which the orientation of a document must be set. For example, when transmitting e-mail or a fax from a MFP, an image having a desired orientation cannot be formed if the top and bottom of the transmission image are unknown. This makes it necessary to always set the orientation of a document. However, a portrait oriented document is presently a default. If the user often uses landscape oriented documents, therefore, the user must perform an operation of setting a landscape orientation as the orientation of a document whenever transmitting an image; otherwise it is sometimes impossible to transmit an image by a desired document orientation.

The fourth problem is that the operation is sometimes complicated when the orientation of a document is unconditionally set. For example, portrait oriented documents are most frequently used in copying, but many users use landscape oriented documents as forms in facsimile. To correctly set the orientation of a transmission document in this case, the user must consciously set the document orientation whenever transmitting a document. That is, the input operation is time-consuming and is not user-friendly.

SUMMARY OF THE INVENTION

To solve at least one of the problems of the above-mentioned related art, the present invention has the following features.

A feature of the present invention is to provide a technique by which a document orientation set for a given function is maintained even when the function is canceled.

Another feature of the present invention is to provide a technique capable of easily confirming the document orientation set for a designated function by the user.

Still another feature of the present invention is to provide a technique by which the user can easily set a document orientation in accordance with a function or application to be executed, and can easily confirm the set orientation.

According to one aspect of the present invention, there is provided an image processing apparatus for reading an image of a document and processing the image, comprising: a receiving unit configured to receive an instruction for using a first function, and receive, from a user, an orientation of the document to be used for the first function; a storage unit configured to store the document orientation received by the receiving unit; and a control unit configured to cause the storage unit to hold the document orientation stored in the storage unit even when the instruction for using the first function is canceled, and use the document orientation for a second function different from the first function.

According to another aspect of the present invention, there is provided an image processing apparatus for reading an image of a document and processing the image, comprising: a determination unit configured to determine whether an orientation of the document is set; a display unit configured to display an operation screen for allowing a user to set an orientation of a document, if the determination unit determines that the orientation of the document is not set, when starting a job to be executed by reading an image of the document; and an execution unit configured to execute the job in accordance with the document orientation set by using the operation screen.

According to still another aspect of the present invention, there is provided an image processing apparatus comprising: a reading unit configured to read an image of a document; a designation unit configured to designate different default document orientations for a first function and a second function, among a plurality of functions in each of which the reading unit reads an image of a document and the image is processed; and a control unit configured to set, when the first function is selected, the default document orientation designated for the first function by the designation unit as an orientation of a document to be read by the reading unit, and set, when the second function is selected, the default document orientation designated for the second function by the designation unit as an orientation of a document to be read by the reading unit.

According to yet another aspect of the present invention, there is provided a control method of controlling an image processing apparatus for reading an image of a document and processing the image, comprising: receiving an instruction for using a first function, and receiving, from a user, an orientation of the document to be used for the first function; storing the document orientation received in the receiving in a storage unit; and causing the storage unit to hold the document orientation stored in the storage unit even when the instruction for using the first function is canceled, and using the document orientation for a second function different from the first function.

In the present invention, information on the document orientation set for a given function is maintained even when the function is canceled. Since this obviates the need to input the document orientation again, and the complexity of the operation can be reduced.

Additionally, in the present invention, the user can readily confirm the set contents of the document orientation.

Further features of the present invention will become apparent from the following description of exemplary embodiments (with reference to the attached drawings).

BRIEF DESCRIPTION OF THE DRAWINGS

FIG. 4 is a flowchart for explaining a process of setting a document orientation in the MFP according to the embodiment;

FIG. 15 is a view showing an example of an application selection screen according to the third embodiment;

FIG. 16 is a view showing an example of a default document orientation setting screen for copying according to the third embodiment;

FIG. 17 is a view showing an example of a screen for designating a document orientation setting method according to the third embodiment; and FIG. 18 is a flowchart for explaining the processing of a job for scanning and transmitting a document according to the third embodiment.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Figure 1:
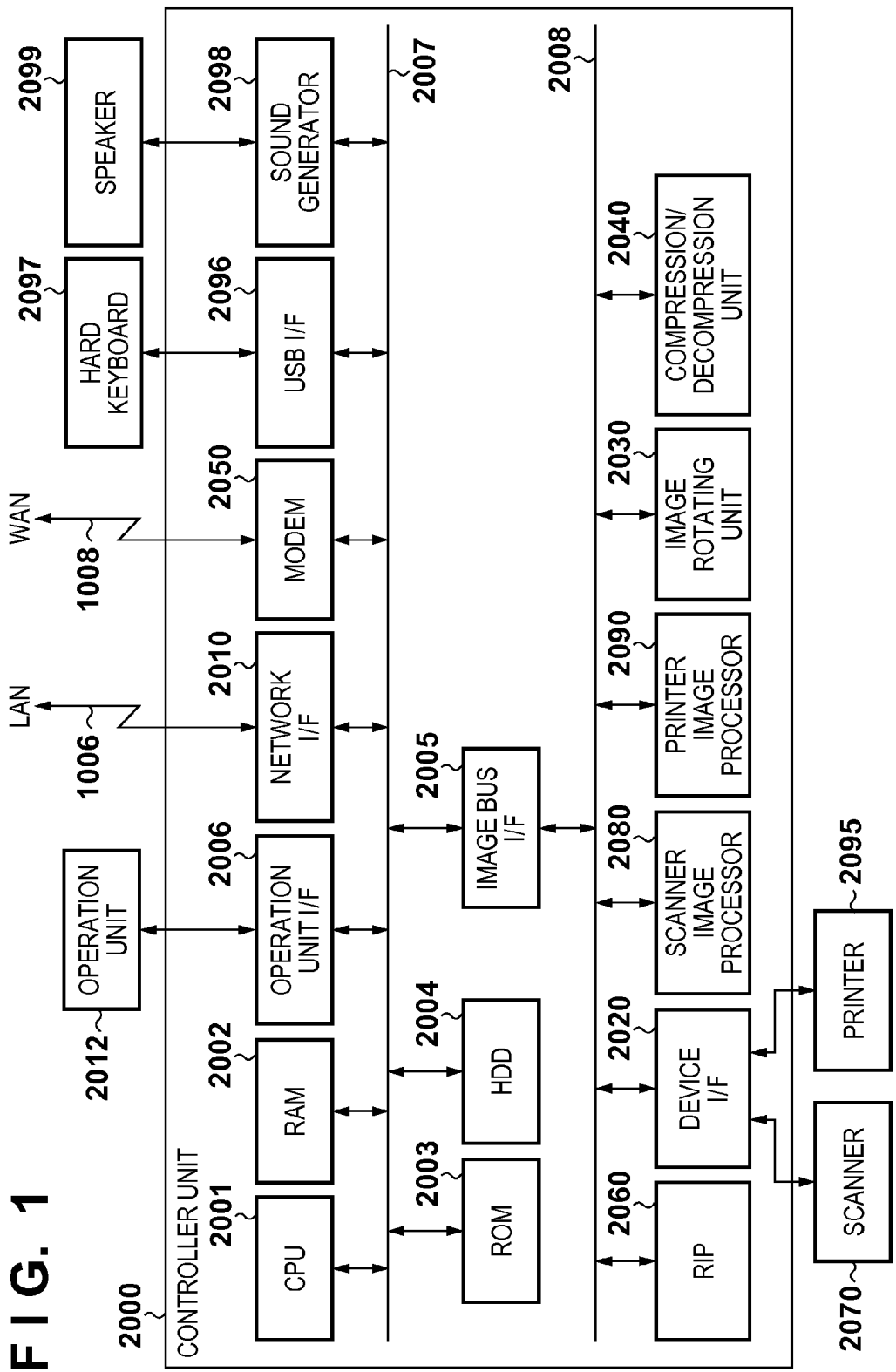
FIG. 1 is a block diagram showing the main components of a digital MFP serving as an image forming apparatus according to an embodiment.

FIG. 1 is a block diagram showing the major parts of a digital multi-function peripheral (MFP) serving as an image processing apparatus according to an embodiment of the present invention.

This digital MFP includes a controller unit 2000. The controller unit 2000 is connected to a scanner 2070 serving as an image input device, a printer 2095 serving as an image output device, and an operation unit 2012. The controller unit 2000 performs control for implementing a copy function of causing the printer 2095 to print image data of a document scanned by the scanner 2070. The controller unit 2000 also performs control for inputting and outputting image information and device information by connecting to a LAN 1006 or public switched telephone network 1008 (WAN).

More specifically, the controller unit 2000 includes a CPU 2001, and the CPU 2001 activates an operation system (OS) by a boot program stored in a ROM 2003. On this OS, the CPU 2001 loads application programs stored in an HDD (Hard Disk Drive) 2004 into a RAM 2002, and executes the programs, thereby executing various kinds of processing. The RAM 2002 is used as a work area of the CPU 2001. The RAM 2002 thus provides the work area, and also provides an image memory area for temporarily storing image data. The HDD 2004 stores the above-mentioned application programs and image data.

In addition to the ROM 2003 and RAM 2002, an operation unit I/F 2006, network I/F 2010, modem 2050, USB I/F 2096, and image bus I/F 2005 are connected to the CPU 2001 through a system bus 2007. The operation unit I/F 2006 controls an interface with an operation unit 2012 including a touch panel, and outputs, to the operation unit 2012, image data to be displayed on it. The operation unit I/F 2006 also transmits, to the CPU 2001, information input on the operation unit 2012 by the user.

The network I/F 2010 is connected to the LAN 1006, and inputs and outputs information across the LAN 1006 with respect to each device on the LAN 1006. The modem 2050 is connected to the public switched telephone network 1008, and inputs and outputs information across the public switched telephone network 1008. A USB device such as a hard keyboard 2097 can be connected to the USB I/F 2096. When a USB device is connected to the USB I/F 2096, the USB I/F 2096 communicates with the connected USB device in accordance with the USB I/F standards, obtains the attribute of the USB device, and notifies the CPU 2001 of the attribute. In response to this attribute notification, the CPU 2001 detects that the USB device is connected or disconnected.

The image bus I/F 2005 is a bus bridge that connects the system bus 2007 and an image bus 2008 for transferring image data at high speed, and converts data formats between these buses. The image bus 2008 is a PCI bus or IEEE1394. The image bus 2008 is connected to a raster image processor (RIP) 2060, device I/F 2020, scanner image processor 2080, printer image processor 2090, image rotating unit 2030, and compression/decompression unit 2040.

The RIP 2060 is a processor that rasterizes a PDL code into a bitmap image. The device I/F 2020 is connected to the scanner 2070 and printer 2095, and performs synchronous system/asynchronous system conversion on image data. The scanner image processor 2080 performs correction, modification, and editing on image data input from the scanner 2070. The printer image processor 2090 performs correction, resolution conversion, and the like corresponding to the printer 2095, on image data to be output to the printer 2095. The image rotating unit 2030 rotates image data. The compression/decompression unit 2040 compresses multilevel image data into JPEG data, and binary image data into JBIG, MMR, or MH data, and decompresses the data.

Figure 2:
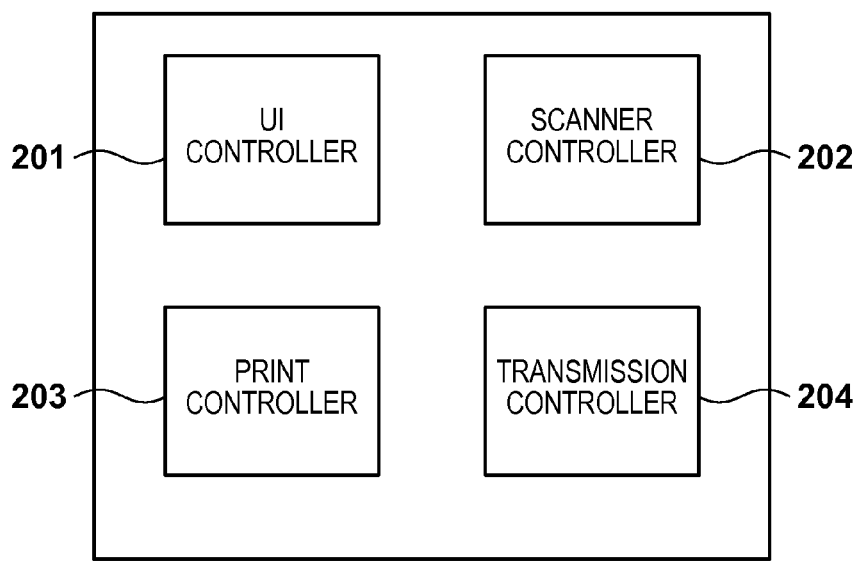
FIG. 2 is a block diagram showing a software configuration for controlling the digital MFP according to the embodiment.

FIG. 2 is a block diagram showing a software configuration for controlling the digital MFP according to this embodiment. The CPU 2001 executes the function of each constituent element shown in FIG. 2 by loading a program stored in the HDD 2004 into the RAM 2002 and executing the program.

A UI controller 201 displays an operation screen on the operation unit 2012, and controls a user interface (UI) for receiving a user's operation. A scanner controller 202 controls a process of scanning a document image by controlling the scanner 2070. A print controller 203 prints an image on paper by controlling the printer 2095. A transmission controller 204 controls a process of transmitting image data scanned by the scanner 2070 to an address designated by the user via the network interface 2010.

Figure 3:
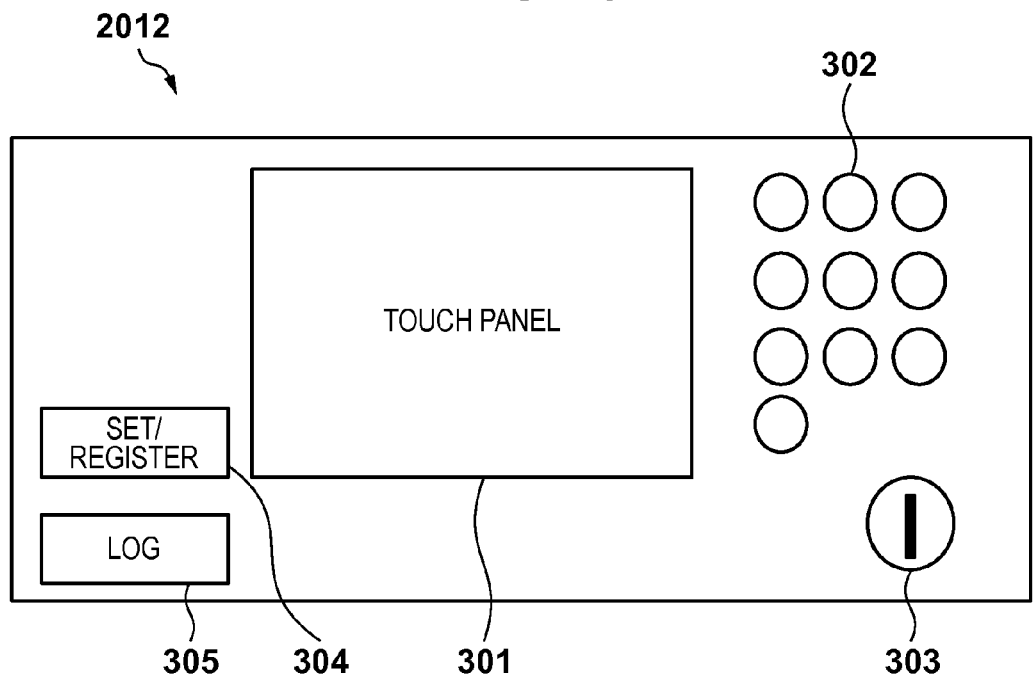
FIG. 3 is a view for explaining an operation unit of the MFP according to the embodiment.

FIG. 3 is a view for explaining the operation unit 2012 of the MFP according to the embodiment.

The operation unit 2012 includes a display unit 301 such as a liquid crystal display including a touch panel, a ten-key pad 302, and a start key 303 for designating the start of a job such as copying, facsimile, or e-mail. When the start key 303 is pressed, the CPU 2001 performs a process of executing a job designated at that point. The operation unit 2012 further includes a "setting/registration" screen call button 304 for calling various setting contents, and a "log" button 305 for calling a job log/status screen.

[First Embodiment]

FIG. 4 is a flowchart for explaining a process of setting a document orientation in a MFP according to the first embodiment.

Figure 13:
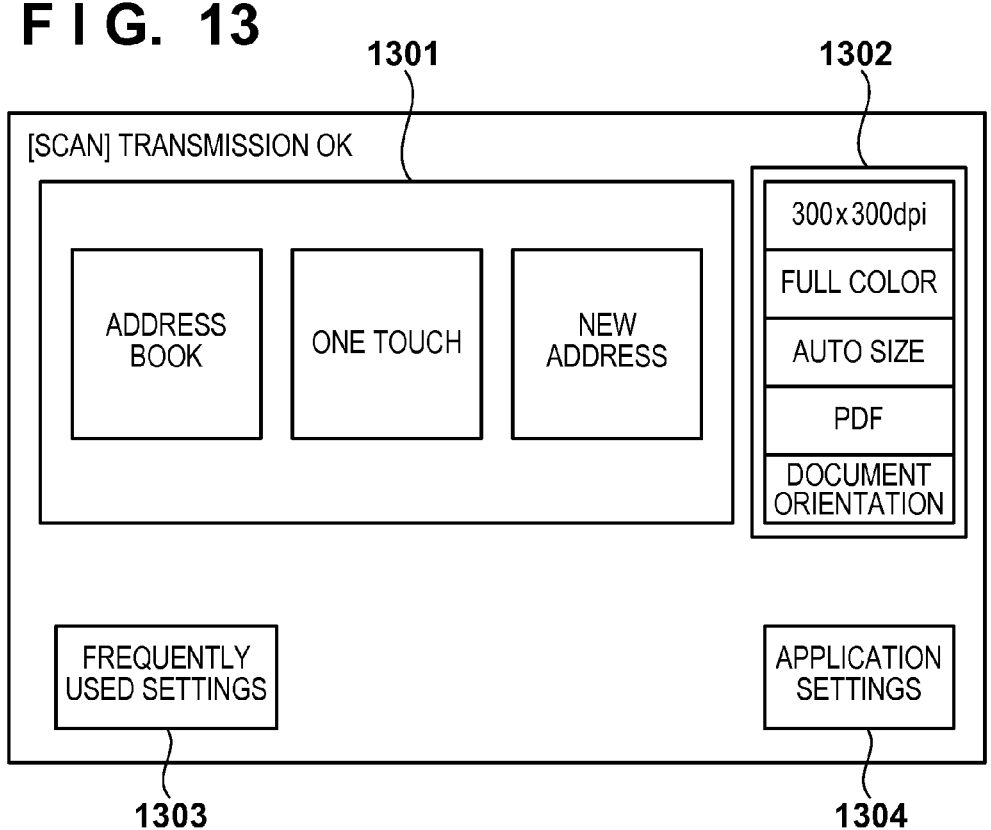
FIG. 13 is a view showing an example of a scan transmission basic operation screen when scanning and transmitting a document according to the second embodiment.

This flowchart shows a process from starting the designation of a document orientation to completing the setting of the document orientation. FIG. 6 is a view showing an example of a screen for designating a document orientation. That is, FIG. 6 shows an example of a screen which the user refers to in the processing of each step in FIG. 4. The CPU 2001 implements each step in FIG. 4 by executing the processing in accordance with a program stored in the HDD 2004. For example, the screen shown in FIG. 6 is displayed when the "set/register" button 304 of the operation unit 2012 is pressed, and "document orientation" is selected in the operation menu. Alternatively, as shown in FIGS. 5 and 13 (to be described later), the screen shown in FIG. 6 is displayed when a given function is designated and "document orientation" is designated on the operation screen of the function.

First, in step S401, the CPU 2001 obtains a document orientation designated by the user. In this step, the user designates the orientation of a document by using the document orientation designating screen shown in FIG. 6, which is displayed on the display unit 301 of the operation unit 2012. For example, when designating a portrait oriented document, the user presses a portrait oriented document setting button 601. On the other hand, when designating a landscape oriented document, the user presses a landscape oriented document setting button 602. The user thus selects the portrait oriented document setting button 601 or landscape oriented document setting button 602, and then presses an OK button 603. Consequently, the orientation of a document is set, and the CPU 2001 obtains the set document orientation. Then, the process advances to step S402, and the CPU 2001 stores, in the RAM 2002, the set value of the document orientation set by the user in step S401. Note that the document orientation setting process is canceled if a cancel button 604 is pressed.

Figure 5:
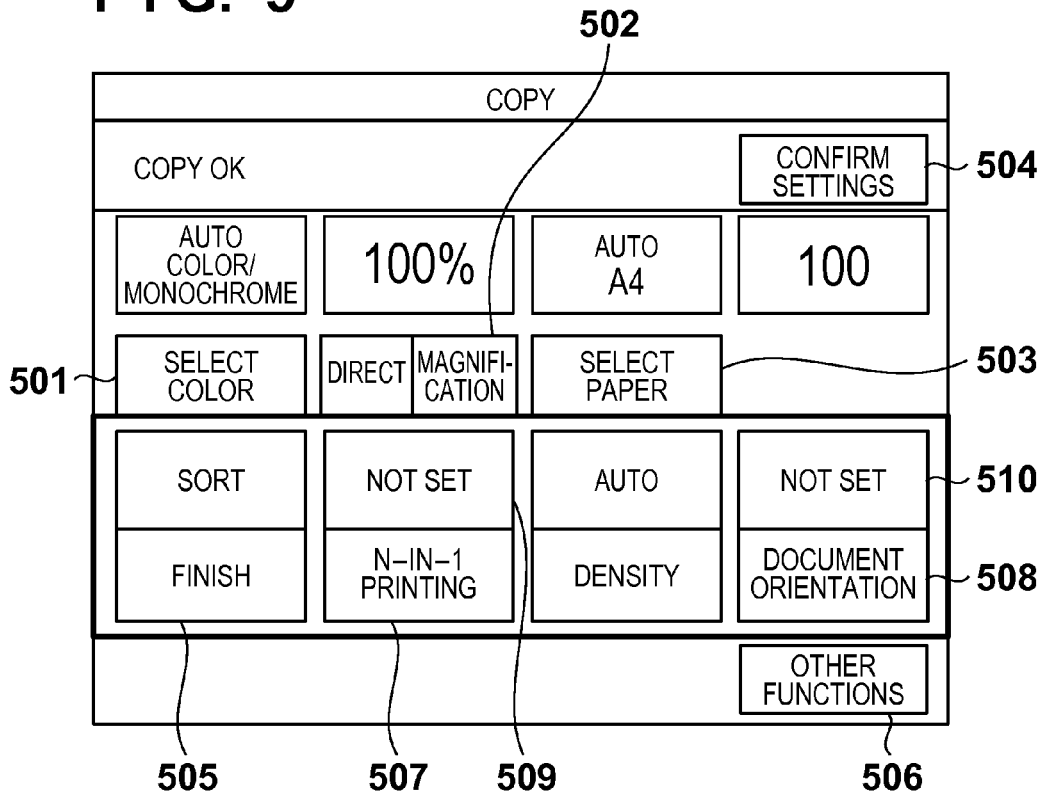
FIG. 5 is a view showing an example of a copy basic operation screen for setting a copying process in the MFP according to the embodiment.
Figure 6:
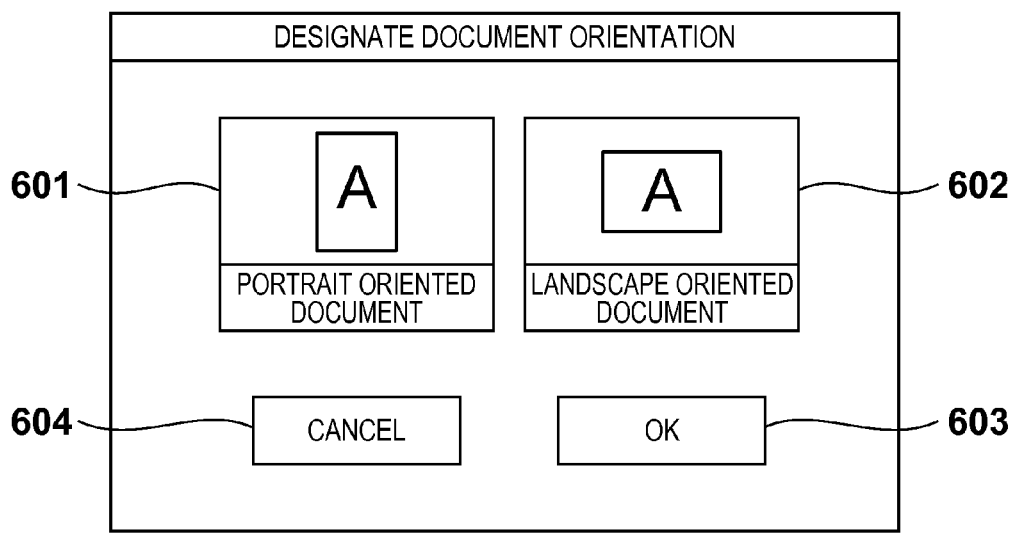
FIG. 6 is a view showing an example of a screen for designating a document orientation.

FIG. 5 is a view showing an example of a copy basic operation screen for setting a copying process in the MFP according to the first embodiment. The display unit 301 of the operation unit 2012 displays this copy basic operation screen.

A color selection button 501 is a button for selecting the output color of a printed product. A magnification button 502 is a button for designating the magnification of a printed product with respect to the document size. A paper selection button 503 is a button for selecting paper to be used in printing. A setting confirmation button 504 is a button for confirming the contents set for the copy function. A shortcut area 505 is an area in which setting contents frequently used among other copy settings can be registered as buttons. Another function button 506 is a button for shifting to a screen for performing advanced settings, in addition to the copy basic settings. In the first embodiment, an N-in-1 printing button 507 and document orientation button 508 are arranged in the shortcut area 505 as an example. When the N-in-1 printing button 507 is pressed, the display shifts to an N-in-1 printing screen shown in FIG. 8. When the document orientation button 508 is pressed, the display shifts to the document orientation designation screen shown in FIG. 6 described above. An N-in-1 printing setting display area 509 displays the setting state of N-in-1 printing. A document orientation setting display area 510 displays the setting state of a document orientation. Referring to FIG. 5, "not set" is displayed in both the N-in-1 printing setting display area 509 and document orientation setting display area 510 because nothing is set in either area.

Figure 7:
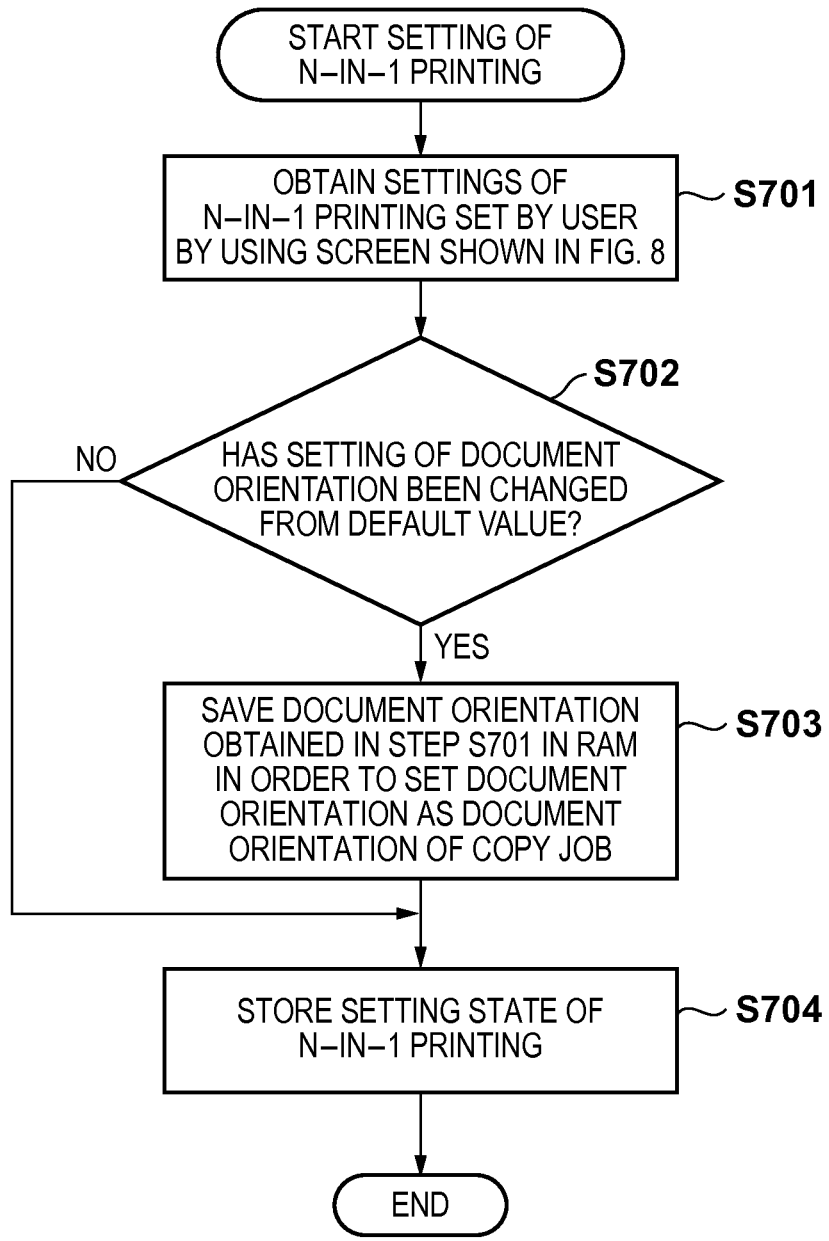
FIG. 7 is a flowchart for explaining a process of obtaining and storing the settings of N-in-1 printing set by using a screen shown in FIG. 8.
Figure 8:
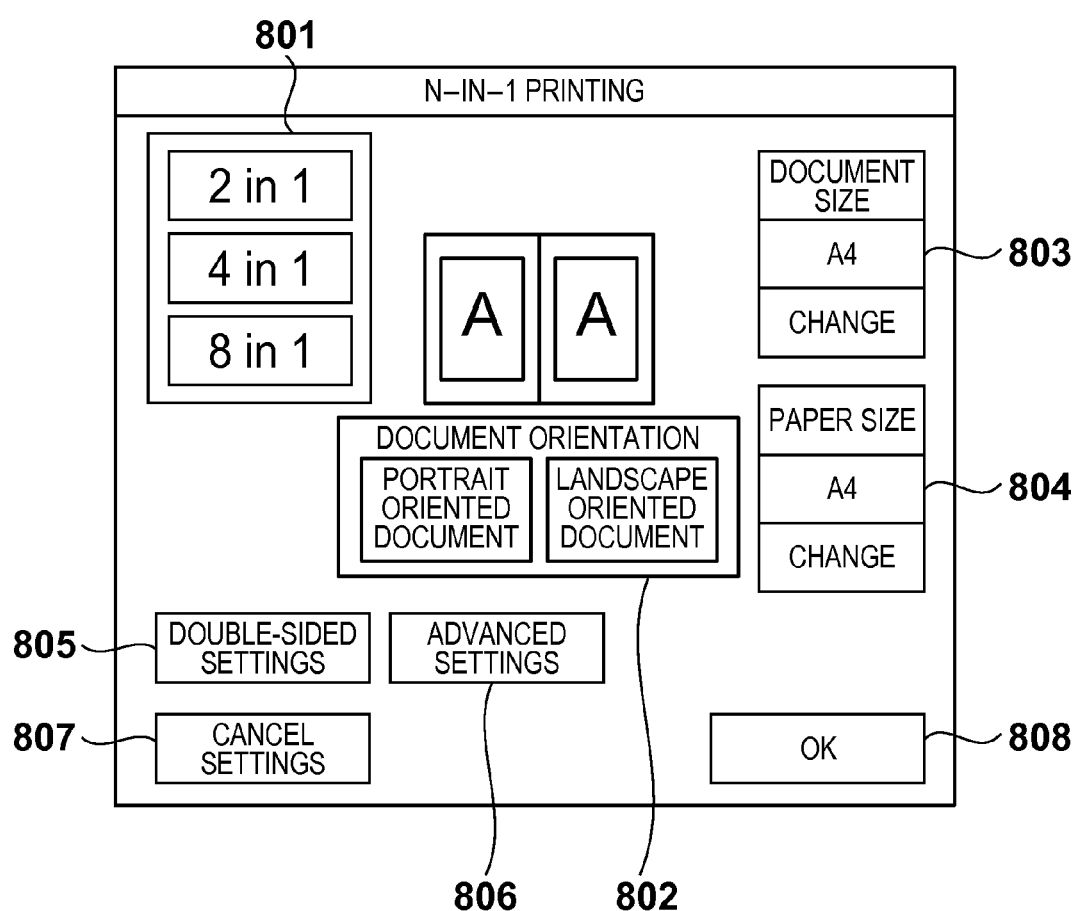
FIG. 8 is a view showing an example of a setting screen for performing various settings of N-in-1 printing.

FIG. 7 is a flowchart for explaining a process of obtaining and storing the settings of N-in-1 printing set by using a screen shown in FIG. 8. FIG. 8 is a view showing an example of a setting screen for performing various settings of N-in-1 printing. Note that "N-in-1 printing" herein mentioned means a process of printing images of a plurality of pages on one sheet of paper, for example, "2-in-1" or "4-in-1". The CPU 2001 implements each step of FIG. 7 by executing the processing in accordance with a program stored in the HDD 2004.

In this process, the user sets N-in-1 printing by using the N-in-1 printing setting screen shown in FIG. 8, which is displayed on the operation unit 2012. The user selects an N-in-1 printing method from page allocation method select buttons (in FIG. 8, "2-in-1", "4-in-1", and "8-in-1" are displayed) in N-in-1 printing setting 801. The first embodiment will be explained by assuming that "2-in-1" is selected. Then, the user selects "portrait oriented document" or "landscape oriented document" as a document orientation from a document orientation designating button 802. The first embodiment will be explained by assuming that a default value is "portrait oriented document", and "landscape oriented document" which is different from the default is selected. When displaying the button 802, setting is displayed in accordance with the value of the default document orientation set in the MFP. When a document size designating button 803 is selected, a screen for designating a document size is displayed. When a paper size change button 804 is selected, a screen for changing a paper size is displayed. When setting double-sided copying, the user designates double-sided copying by designating a double-side setting button 805. When an advanced setting button 806 is pressed, the display shifts to a screen for performing advanced settings concerning N-in-1 printing. When the user presses an OK button 808 after thus completing the setting of the various items, the CPU 2001 obtains the various items (set contents) set by using this screen in step S701. Note that when canceling the settings of N-in-1 printing set by the user on the screen shown in FIG. 8, the user presses a setting cancel button 807.

Then, the process advances to step S702, and the CPU 2001 determines whether the document orientation obtained in step S701 has been changed from the default document orientation. If it is determined that the document orientation has been changed from the default orientation, the process advances to step S703, and the CPU 2001 temporarily stores, in the RAM 2002, the setting of the document orientation obtained in step S701 as the document orientation of the copy job. After that, the process advances to step S704, and the CPU 2001 stores the N-in-1 printing setting state obtained in step S701 in the RAM 2002. Thus, the N-in-1 printing setting and storage process are complete. On the other hand, if it is determined in step S702 that the document orientation has not been changed from the default orientation, the process advances to step S704 by skipping step S703, and the CPU 2001 stores the N-in-1 printing setting state obtained in step S701 in the RAM 2002.

As described above, if the document orientation is changed from the default value on the N-in-1 printing setting screen of the copy function, the changed document orientation is stored as the document orientation of the copy job in the RAM 2002.

Figure 10:
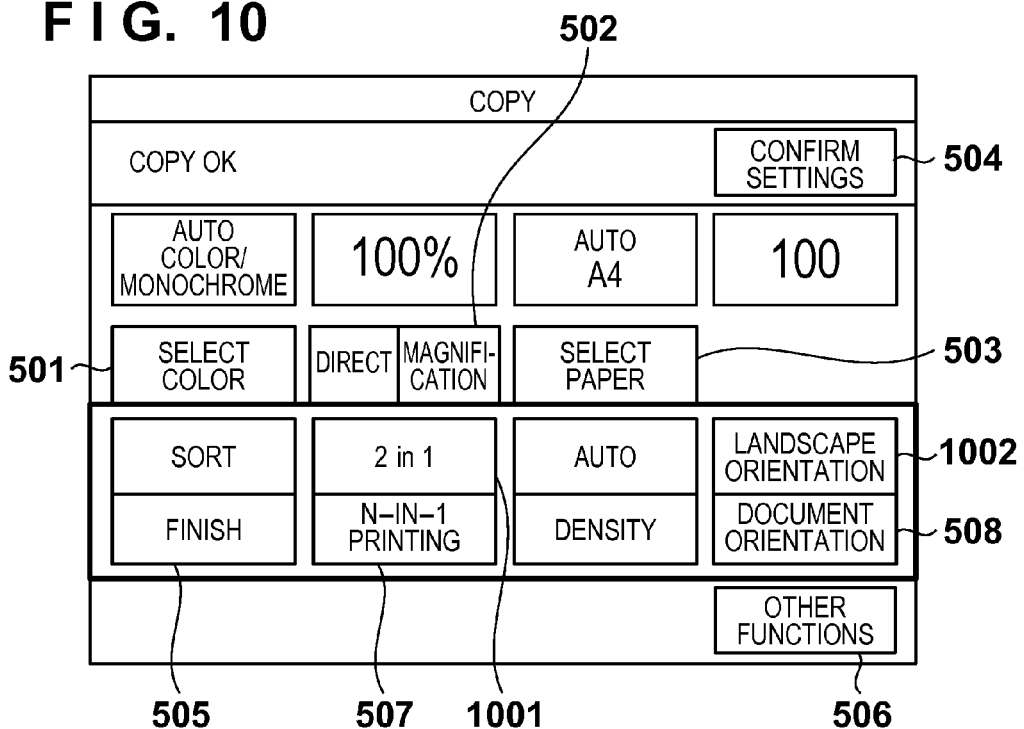
FIG. 10 is a view showing an example of a copy basic operation screen after the process shown in FIG. 7 is executed.

FIG. 10 is a view showing an example of a copy basic operation screen after the process shown in FIG. 7 is executed. Note that the same reference numerals as in FIG. 5 described above denote the same portions in FIG. 10, and a repetitive explanation thereof will be omitted.

Comparing FIG. 10 with FIG. 5 reveals that an N-in-1 printing setting area 1001 of FIG. 10 displays "2-in-1". Also, a document orientation setting area 1002 displays a document orientation "landscape" set on the N-in-1 printing function setting screen.

Figure 9:
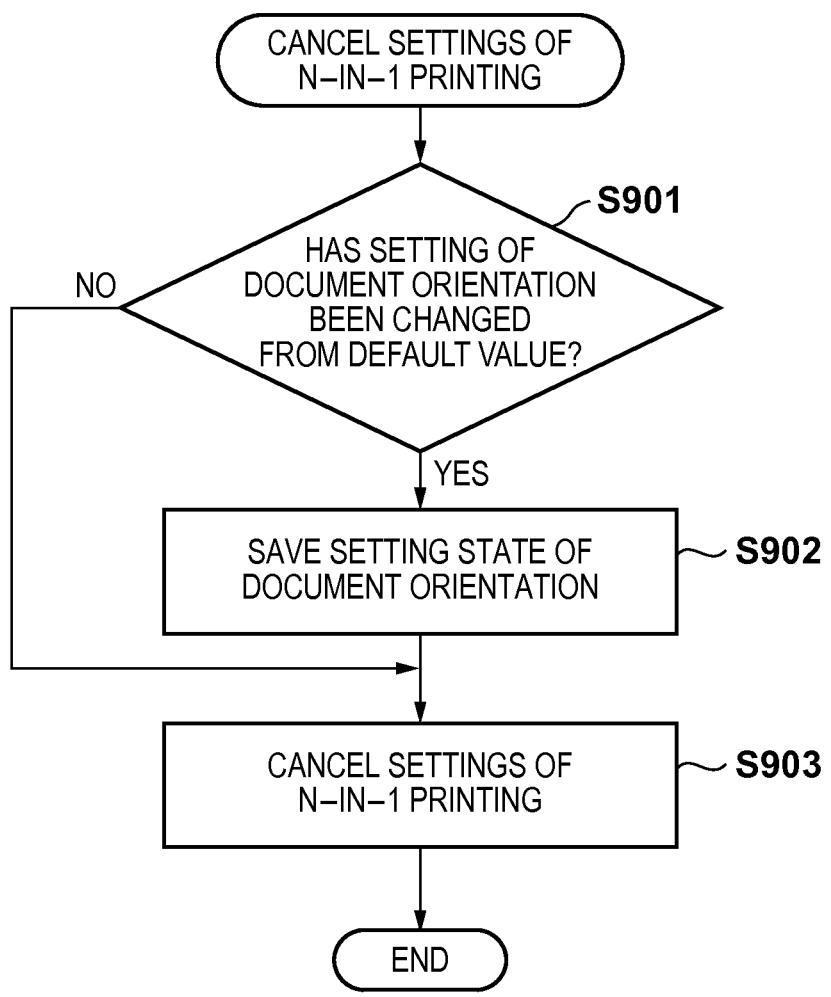
FIG. 9 is a flowchart for explaining a process of canceling the settings of N-in-1 printing.

FIG. 9 is a flowchart for explaining a process of canceling the settings of N-in-1 printing set by the above-described process. This process will be explained with reference to the N-in-1 printing setting screen shown in FIG. 8 described above. The CPU 2001 implements each step shown in FIG. 9 by executing the processing in accordance with a program stored in the HDD 2004.

This process is started when the user presses the setting cancel button 807 of the N-in-1 printing setting screen shown in FIG. 8. First, in step S901, the CPU 2001 determines whether the document orientation has been changed from the default value (portrait orientation). If it is determined that the document orientation has been changed, the process advances to step S902, and the CPU 2001 saves the document orientation setting state of the job temporarily stored in the RAM 2002. After that, the process advances to step S903. If it is determined in step S901 that the document orientation has not been changed from the default value, the process advances to step S903, and the CPU 2001 cancels the N-in-1 printing settings temporarily stored in the RAM 2002 in step S704 of FIG. 7, and restores the default value.

Figure 11:
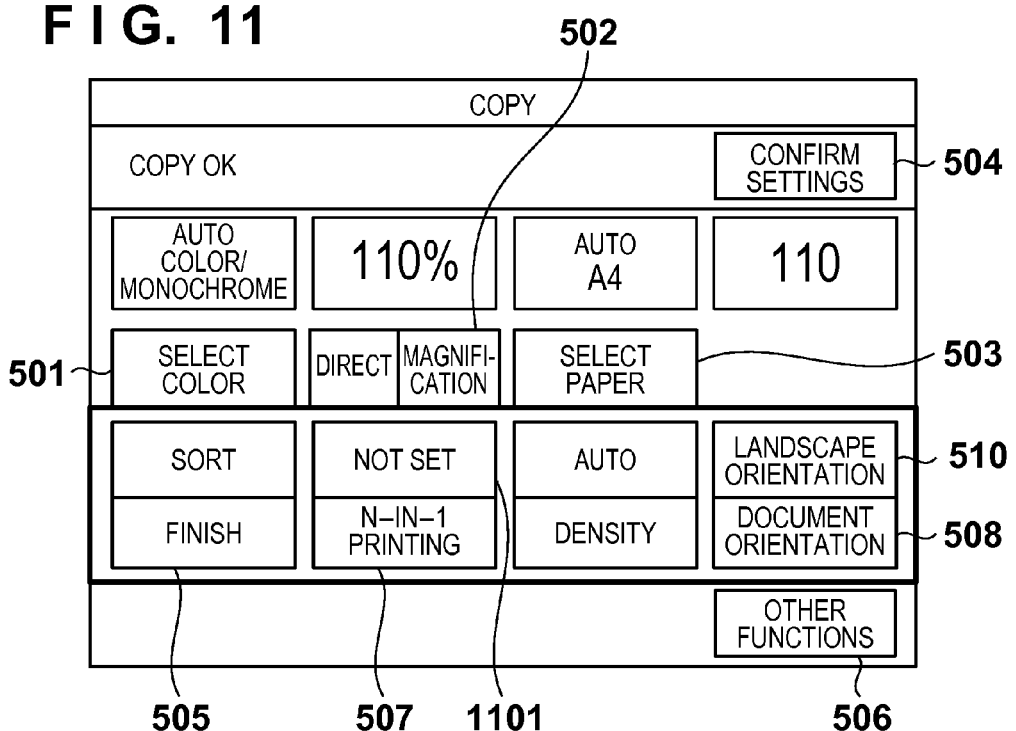
FIG. 11 is a view showing an example of a copy basic operation screen displayed after the process of canceling the settings of N-in-1 printing.

FIG. 11 is a view showing an example of a copy basic operation screen to be displayed after the N-in-1 printing setting canceling process. Note that the same reference numerals as in FIGS. 5 and 10 described above denote the same portions in FIG. 11, and a repetitive explanation thereof will be omitted.

Comparing FIG. 11 with FIG. 10 shows that an N-in-1 printing setting area 1101 displays "not set" indicating that N-in-1 printing is not set. Also, the document orientation setting area 510 holds "landscape orientation" set in the above-described N-in-1 printing function setting screen.

As has been described above, when a document orientation is designated by the N-in-1 printing function in a copy job, information indicating the document orientation is left behind as the document orientation of the copy job, even if the setting of the N-in-1 printing function is canceled. Even when setting another function, therefore, it is possible to use (automatically set) the document orientation set by the N-in-1 printing function. Accordingly, the user need not set the document orientation again whenever switching functions, and this can improve the user-friendliness of the operation.

Also, as shown in FIGS. 5, 10, and 11, the copy basic operation screen displays a presently designated document orientation. This enables the user to readily confirm the presently set document orientation.

[Second Embodiment]

In the above-described first embodiment, a function requiring the setting of a document orientation has been explained by taking N-in-1 printing as an example. In an e-mail function or facsimile transmission function, however, if the user has not designated any document orientation beforehand, a transmission image may be turned upside down. An example in which the user is automatically demanded to input a document orientation if he or she does not input any document orientation for a function requiring the setting of a document orientation as described above will be explained below. Note that the hardware configuration of an image processing apparatus (digital MFP) according to the second embodiment is the same as that of the first embodiment described above, so a repetitive explanation thereof will be omitted.

Figure 12:
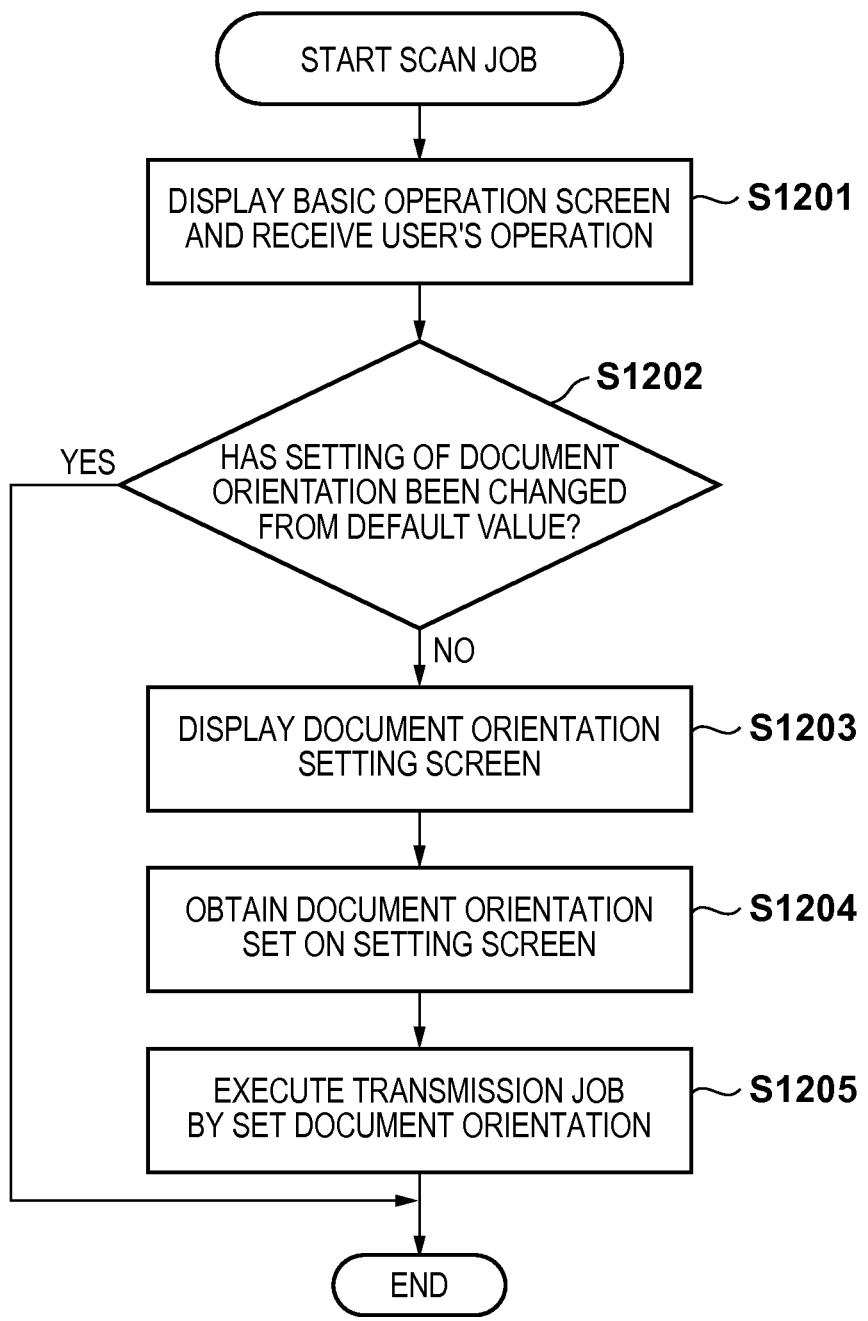
FIG. 12 is a flowchart for explaining a process of scanning and transmitting a document by a MFP according to the second embodiment of the present invention.

FIG. 12 is a flowchart for explaining a process in which the MFP according to the second embodiment of the present invention scans and transmits a document. A CPU 2001 implements each step in FIG. 12 in accordance with a program stored in an HDD 2004.

FIG. 13 is a view showing an example of a scan transmission basic operation screen when scanning and transmitting a document.

First, in step S1201, the CPU 2001 displays the scan transmission basic operation screen shown in FIG. 13. The user designates a transmission job by using this basic operation screen. If it is detected that a start key 303 of an operation unit 2012 is pressed after that, the process advances to step S1202.

The scan transmission basic operation screen shown in FIG. 13 will be explained below. FIG. 13 shows an address input button 1301 by which the user can designate an address. An address can be input by any of "address book", "one touch", and "new address". A transmission setting button 1302 is a button for performing transmission settings such as a read resolution, read color mode, size, and document orientation. An application setting button 1304 is a button for calling various advanced settings when reading or transmitting a document. FIG. 13 also shows a "frequently used setting" button 1303 for calling transmission settings saved in a persistent area.

On this scan transmission basic operation screen, e-mail transmission and file transmission can be set. It is also possible to set facsimile transmission depending on the settings of a device.

In step S1202, the CPU 2001 determines whether the setting of a document orientation has been changed from a default value by the transmission setting button 1302. If it is determined that the document orientation setting has not been changed, the user may have forgotten to set the document orientation, so the process advances to step S1203. If the document orientation setting has been changed, the process is terminated. In step S1203, the CPU 2001 displays the screen for designating the document orientation shown in FIG. 6 on the operation unit 2012. The second embodiment differs from the N-in-1 printing function of the above-described first embodiment in that the document orientation is set for a scan transmission job. However, the screen layout and setting contents are the same as those of the document orientation designating screen shown in FIG. 6, so a repetitive explanation thereof will be omitted.

Then, the process advances to step S1204, and the CPU 2001 obtains the document orientation set by the user by using the screen shown in FIG. 6. This operation is also the same as the operation in step S401 of FIG. 4 of the first embodiment except that the document orientation is set for a transmission job, so a repetitive explanation thereof will be omitted. After that, the process advances to step S1205, and, in accordance with the set document orientation, the CPU 2001 performs a transmission process corresponding to the transmission job, based on the job settings stored in the RAM 2002.

As described above, when it is necessary to set the document orientation such as in a transmission job of scanning a document and transmitting the document by e-mail or file transmission, the user is automatically demanded to confirm the setting. That is, if the user does not designate any document orientation when it is necessary to set the document orientation, the user is demanded to confirm the setting by automatically displaying the screen for setting the document orientation before the job is started. This allows the user to reliably set the document orientation.

[Third Embodiment]

In each of the above-described first and second embodiments, the method of setting the document orientation for a function requiring the setting of the document orientation has been explained. However, if portrait oriented documents are most frequently used in copying and landscape oriented documents are most frequently used in facsimile, a default document orientation needs to be set for each of applications (for example, functions such as copying, e-mail, and facsimile) having different jobs. A "default" herein mentioned is a value preset by an apparatus after the apparatus is activated or a reset button is pressed and before the user changes the setting. The third embodiment like this will be explained below. Note that the hardware configuration of an image processing apparatus (digital MFP) according to the third embodiment is the same as that of the above-described first embodiment, so a repetitive explanation thereof will be omitted.

Figure 14:
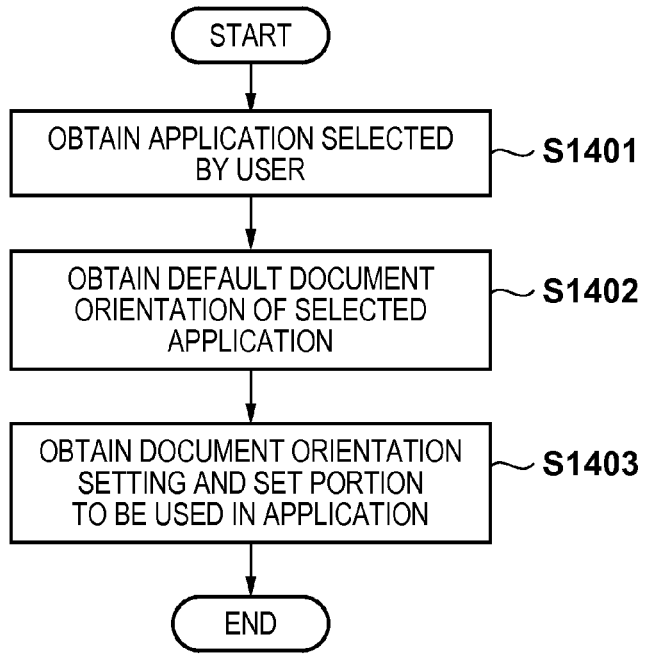
FIG. 14 is a flowchart for explaining a process of setting a default document orientation for each application in a MFP according to the third embodiment.

FIG. 14 is a flowchart for explaining a process of setting a default document orientation for each application in the MFP according to the third embodiment of the present invention. A CPU 2001 implements each step in FIG. 14 by executing the processing in accordance with a program stored in an HDD 2004.

FIG. 15 is a view showing an example of an application selecting screen according to the third embodiment.

FIG. 16 is a view showing an example of a default document orientation setting screen for copying according to the third embodiment.

FIG. 17 is a view showing an example of a screen for designating a document orientation setting method according to the third embodiment.

First, in step S1401 of FIG. 14, the CPU 2001 obtains an application selected by the user by using the application selecting screen shown in FIG. 15, which is displayed on an operation unit 2012.

The application selecting screen shown in FIG. 15 includes a copy application document orientation setting button 1501, e-mail application document orientation setting button 1502, and facsimile application document orientation setting button 1503. These applications for which document orientations can be selected as examples, and any application for which a document orientation is settable can be defined and displayed in each button. If any of the copy application document orientation setting button 1501, e-mail application document orientation setting button 1502, and facsimile application document orientation setting button 1503 is pressed, the display shifts to a default document orientation setting screen 1600 shown in FIG. 16. Note that if an OK button 1504 shown in FIG. 15 is pressed, the display can return to the source from which this screen is called. However, the source from which this screen is called is not directly related to the third embodiment, so an explanation thereof will be omitted.

Then, the process advances to step S1402, and the CPU 2001 obtains the default document orientation to be used in the application designated by the user by using the default document orientation setting screen shown in FIG. 16, which is displayed on the operation unit 2012.

The default document orientation setting screen shown in FIG. 16 includes a portrait oriented document button 1601 and landscape oriented document button 1602. If one of the buttons 1601 and 1602 is selected and a next button 1604 is pressed, a default document orientation is determined for the selected application, and the display shifts to the document orientation setting method designating screen shown in FIG. 17. Note that if a return button 1603 shown in FIG. 16 is pressed, the display shifts to the application selecting screen shown in FIG. 15.

After that, the process advances to step S1403, and the CPU 2001 obtains the document orientation setting method selected by using the document orientation setting method designating screen shown in FIG. 17, which is displayed on the operation unit 2012.

On the document orientation setting method designating screen shown in FIG. 17, it is possible to select one of "rewrite default value of application", "make designation of document orientation indispensable for each job", and "make arbitrary designation possible for each job". The user can designate one of a button 1701 for rewriting the default value of an application, a button 1702 for making the designation of a document orientation indispensable for each job, and a button 1703 for making arbitrary designation possible for each job. When the user selects one of these buttons and presses an OK button 1705, the document orientation and setting method set for the application are determined, and the CPU 2001 stores the document orientation and setting method of the application in the HDD 2004. After that, the display shifts to the application selecting screen shown in FIG. 15. If a return button 1704 shown in FIG. 17 is pressed, the display shifts to the default document orientation setting screen shown in FIG. 16 without determining the data designated on the document orientation setting method designating screen shown in FIG. 17.

FIG. 18 is a flowchart for explaining the process of a scan transmission job according to the third embodiment. The CPU 2001 implements each step in FIG. 18 by executing the processing in accordance with a program stored in the HDD 2004.

First, in step S1801, the CPU 2001 obtains the contents set by the user by using the scan transmission basic operation screen shown in FIG. 13, which is displayed on the operation unit 2012. If the user presses the start key 303 of the operation unit 2012 in step S1802, the process advances to step S1803. Note that an explanation of the scan transmission basic operation screen shown in FIG. 13 is the same as that of step S1201 in FIG. 12, and hence will be omitted.

In step S1803, the CPU 2001 reads out information stored in the HDD 2004, and determines whether the designation of a document orientation is indispensable for the scan transmission application. If it is determined that the designation is indispensable, the process advances to step S1804, and the CPU 2001 controls the display of the document orientation setting screen shown in FIG. 6 in the same manner as in step S1203 of FIG. 12. Then, the process advances to step S1805, and the CPU 2001 obtains the document orientation set by the user by using the screen in the same manner as in step S1204 of FIG. 12. This operation is also the same as the operation in step S1204, so a repetitive explanation thereof will be omitted. Subsequently, the process advances to step S1806, and the CPU 2001 sets the document orientation setting obtained in step S1805 as the document orientation of the scan transmission job. After that, the process advances to step S1808.

On the other hand, if it is determined that the designation of a document orientation is not indispensable in step S1803, the process advances to step S1807, and the CPU 2001 sets the designation of a document orientation set for the scan transmission application as the document orientation of this transmission job. After that, the process advances to step S1808, and the CPU 2001 performs transmission of the scan transmission job based on the job settings stored in the RAM 2002.

In the third embodiment as described above, a default document orientation and a setting method thereof can be designated for each of applications (for example, copying, e-mail, and facsimile) having different jobs. This makes it possible to demand the user to set a document orientation in accordance with an application.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-259514, filed Nov. 28, 2011, which is hereby incorporated by reference herein in its entirety.

What is claimed is:

1. An image processing apparatus having a plurality of functions which include a first function and a second function, comprising:

a reading unit configured to read an original to generate image data;

a receiving unit configured to receive, from a user, an orientation of the original to be read by the reading unit when the first function, which requires the orientation of the original, is selected;

a storage unit configured to store the orientation received by the receiving unit; and a control unit configured to set, in a case where the second function, which requires the orientation of the original, is selected after the first function is canceled, the orientation stored in the storage unit for the second function.

2. The image processing apparatus according to claim 1, wherein the storage unit is configured to store the orientation received by the receiving unit in a case where the received orientation is different from a default value.

3. The image processing apparatus according to claim 1, wherein the first function or the second function is a page aggregation function.

4. The image processing apparatus according to claim 1, wherein the first function or the second function is a copy function, e-mail function, or a facsimile function.

5. The image processing apparatus according to claim 1, wherein the first function is a function corresponding to a first application and the second function is a function corresponding to a second application.

6. A method for controlling an image processing apparatus having a plurality of functions which include a first function and a second function and a reading unit configured to read an original to generate image data, the method comprising:

receiving, from a user, an orientation of the original to be read by the reading unit, when the first function, which requires the orientation of the original, is selected;

storing, in a memory, the orientation received in the receiving step; and setting, in a case where the second function, which requires the orientation of the original, is selected after the first function is canceled, the orientation stored in the memory for the second function.

7. A non-transitory computer-readable storage medium storing a computer executable program for executing a method for controlling an image processing apparatus having a plurality of functions which include a first function and a second function a reading unit configured to read an original to generate image data, the method comprising:

receiving, from a user, an orientation of the original to be read by the reading unit, when the first function, which requires the orientation of the original, is selected;

storing, in a memory, the orientation received in the receiving step; and setting, in a case where the second function, which requires the orientation of the original, is selected after the first function is canceled, the orientation stored in the memory for the second function.

* * * * *